(12) United States Patent
Eguchi

(10) Patent No.: US 7,411,793 B2
(45) Date of Patent: Aug. 12, 2008

(54) OPTICAL DISK DEVICE

(75) Inventor: Naoki Eguchi, Kawasaki (JP)

(73) Assignee: Toshiba Samsung Storage Technology Corporation, Kawasaki (JP)

( * ) Notice: Subject to any disclaimer, the term of this patent is extended or adjusted under 35 U.S.C. 154(b) by 0 days.

(21) Appl. No.: 11/848,794

(22) Filed: Aug. 31, 2007

(65) Prior Publication Data

US 2008/0043367 A1 Feb. 21, 2008

Related U.S. Application Data

(63) Continuation of application No. 11/318,760, filed on Dec. 28, 2005, now Pat. No. 7,315,452.

(30) Foreign Application Priority Data

Dec. 28, 2004 (JP) .............................. 2004-381991
Dec. 28, 2004 (JP) .............................. 2004-381992

(51) Int. Cl.
*H05K 7/20* (2006.01)
*H01L 23/38* (2006.01)

(52) U.S. Cl. ...................... 361/714; 361/685; 361/725; 361/727; 360/98.01; 360/97.01; 360/97.02; 360/99.02; 720/600; 720/658; 720/671; 720/659

(58) Field of Classification Search ................. 361/685, 361/687–727, 736, 737; 360/97.01–97.08, 360/98.01, 98.02, 99.02, 132; 720/600, 620, 720/658–671; 369/75.11, 77.11
See application file for complete search history.

(56) References Cited

U.S. PATENT DOCUMENTS

| 6,320,723 | B1 | 11/2001 | Bernett |
| 6,434,000 | B1 | 8/2002 | Pandolfi |
| 6,603,659 | B2 | 8/2003 | Kim et al. |
| 2005/0152118 | A1 | 7/2005 | Cho |
| 2005/0169120 | A1* | 8/2005 | Toyoda et al. ............ 369/30.27 |

FOREIGN PATENT DOCUMENTS

| JP | 08-203263 | 8/1996 |
| JP | 11-039770 | 2/1999 |
| JP | 2000-311478 | 11/2000 |
| JP | 2003-178570 | 6/2003 |
| JP | 02004253085 A | 9/2004 |

* cited by examiner

*Primary Examiner*—Michael V Datskovskiy
(74) *Attorney, Agent, or Firm*—Oblon, Spivak, McClelland, Maier & Neustadt, P.C.

(57) ABSTRACT

An optical disk device of the present invention has a main PC board carrying a semiconductor element and attached at the rear of a drawer to efficiently dissipate a heat generated from the semiconductor element. The drawer is formed of a material having good thermal conductivity. A thermal conductive member having good thermal conductivity is interposed between the IC desired to be dissipate heat and the drawer.

3 Claims, 13 Drawing Sheets

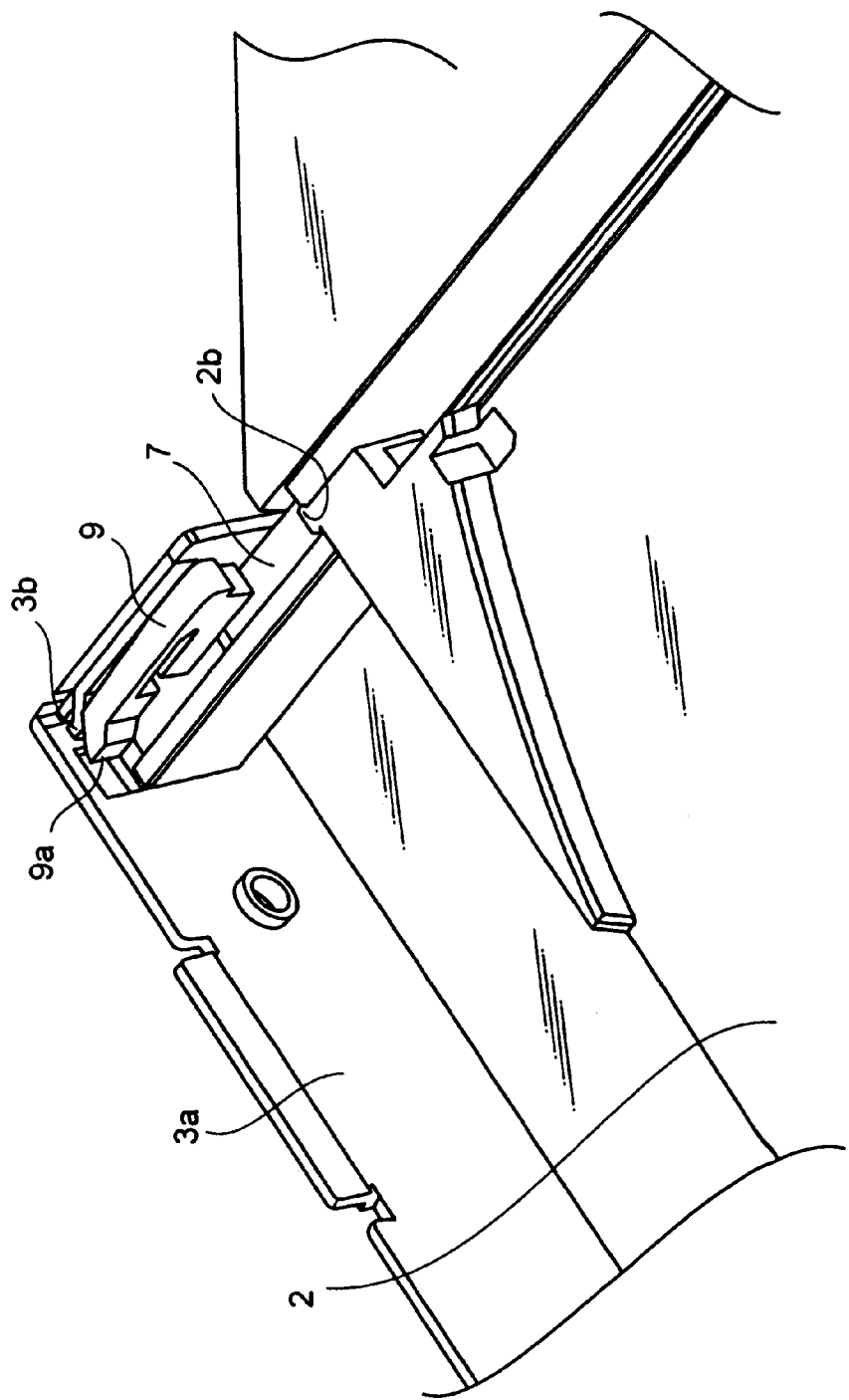

OPTICAL DISK DEVICE

CROSS-REFERENCE TO RELATED APPLICATIONS

The present continuation application claims the benefit of priority under 35 U.S.C. §120 to application Ser. No. 11/318,760, filed on Dec. 28, 2005, now U.S. Pat. No. 7,315,452 and under 35 U.S.C. §119 from Japanese Patent Applications Nos. 2004-381991, filed on Dec. 28, 2004, and 2004-381992, filed on Dec. 28, 2004; the entire contents of each of which are incorporated herein by reference.

BACKGROUND OF THE INVENTION

1. Field of the Invention

The present invention relates to an optical disk device. More particularly, the present invention relates to a slim type optical disk device for carrying a notebook-sized personal computer having features in a heat dissipating structure of a semiconductor element, such as a motor driver IC, for controlling the rotation of a disk motor.

2. Description of the Related Art

Generally, a drive system IC, such as a motor driver IC, for controlling the rotation of a disk motor carried in an optical disk device generates a large amount of heat. Accordingly, a cooling mechanism is provided in the optical disk device.

For example, as a cooling mechanism in a slim type optical disk device for carrying a notebook-sized personal computer, there is proposed an optical disk device of a heat dissipating structure using an external housing with which heat radiated from the driver IC is transmitted from the read face of a step part of the chassis to the whole chassis to cool the chassis by wind generated due to the rotation of a disk (for example, refer to Patent Document 1: Jpn. Pat. Appln. Laid-Open Publication No. 2000-11478).

The internal structure of the optical disk device has become complex due to recent high double speed and high frequency transmission. For example, a substrate carrying a driver IC, etc. is mounted at a sliding mechanical body (drawer) side. In such a structure, unlike a device disclosed in the patent document 1, there is a problem that a heat dissipation structure using an external housing so that a substrate carrying a semiconductor element is fixed to the external housing to radiate the heat of the driver IC of the semiconductor element, cannot be adopted.

BRIEF SUMMARY OF THE INVENTION

According to embodiments of the present invention, the present invention has an object of efficiently transmitting heat of a semiconductor element to a drawer side and efficiently dissipating the heat transmitted to the drawer side into the air.

The present invention may provide an optical disk device, comprising: a mechanical chassis carrying a driving mechanism supporting and controlling the rotation of an information recording medium; a substrate on which a semiconductor element is mounted; and a drawer arranged oppositely to the information recording medium, carrying the mechanical chassis and formed at least partly using a material having good thermal conductivity, wherein the semiconductor element is contacted with the portion of the material having the good thermal conductivity of the drawer through the thermally conductive member having good thermal conductivity.

BRIEF DESCRIPTION OF THE DRAWINGS

FIG. 8 is a perspective view showing the detail of a lateral pressure operating portion of the optical disk device;

DETAILED DESCRIPTION OF THE INVENTION

Figure 1:
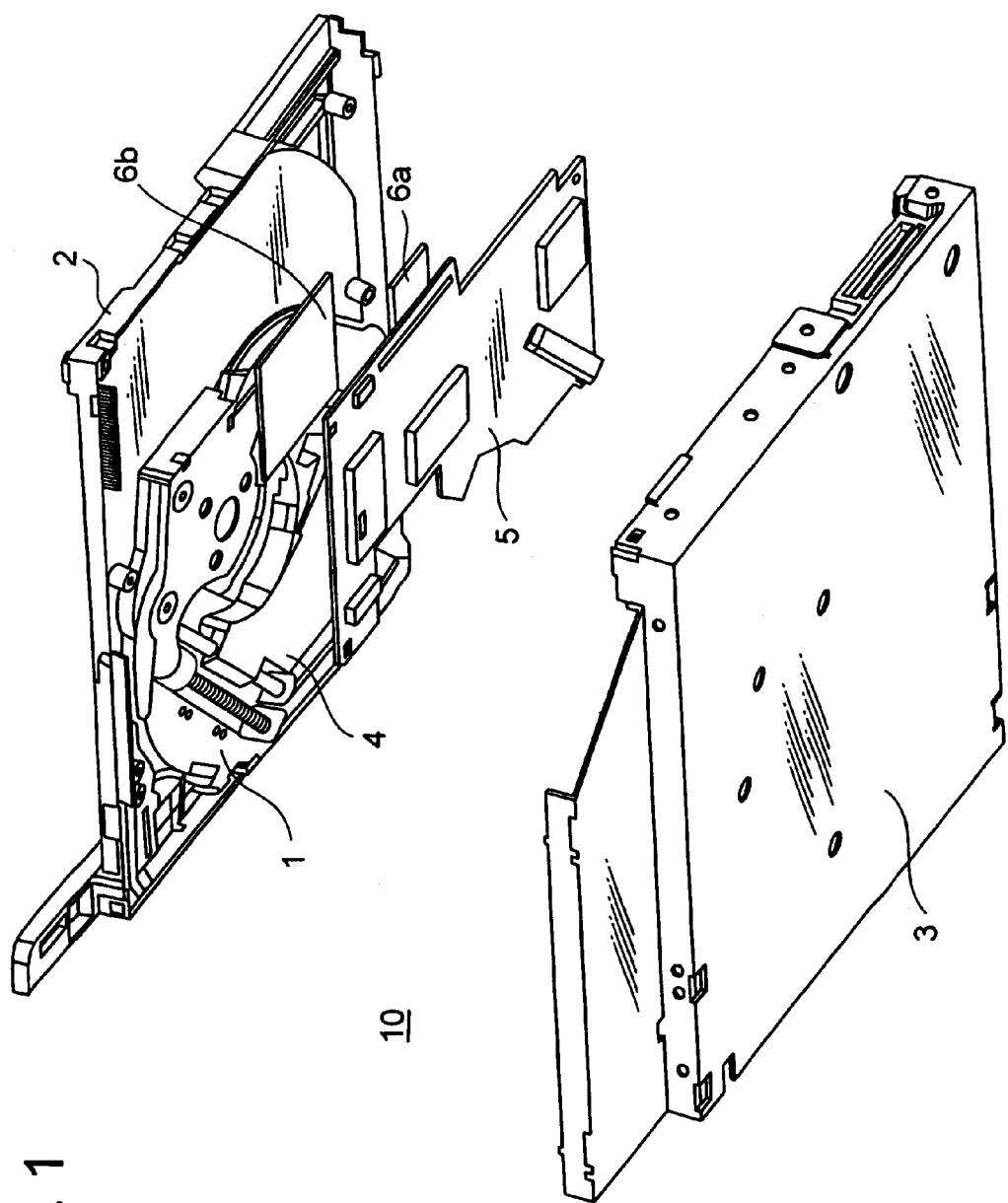
FIG. 1 is an exploded perspective view of an essential portion of an optical disk device according to an embodiment of the present invention.

According to the present invention, the heat of a semiconductor element is efficiently transmitted to a drawer side. Thermal convection is included by a wind flow velocity near a disk opposite in the vicinity of the drawer. The heat transmitted to the drawer side is efficiently radiated to the atmosphere. Thus, the rise of the internal temperature of the optical disk device is suppressed.

Hereinafter, an embodiment of the present invention will be described by referring to the drawings. In the respective drawings, the same reference numerals are denoted at the same positions, and a duplicated explanation will be omitted.

Figure 2:
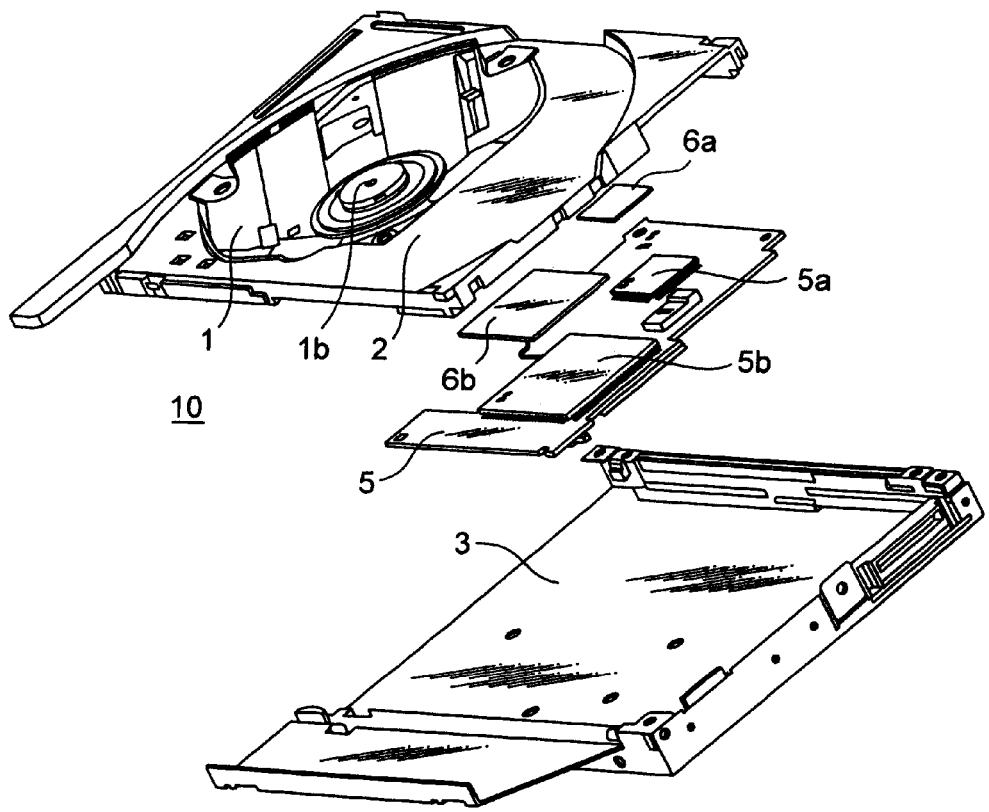
FIG. 2 is an exploded perspective view of an essential portion of the optical disk device according to the embodiment of the present invention.

FIG. 1 and FIG. 2 are exploded perspective views of the essential portion of the optical disk device according to the embodiment of the present invention. FIG. 1 shows the optical disk device as viewed obliquely from the back side. FIG. 2 shows the optical disk device as viewed obliquely from the front side. The optical disk device 10 comprises a traverse mechanical chassis 1 carrying mechanisms for rotating an optical disk of an information recording medium and reading/writing data, a drawer 2 of a base member which can slide and move from a device body in which the traverse mechanical chassis 1 is mounted and the optical disk device 10 is assembled, and a bottom plate 3 for protecting the drawer 2 and the mechanical chassis 1.

In the mechanical chassis 1, a pickup head 4 for reading/writing data, a disk motor 1b for rotatably driving the optical disk, etc. are mounted. In the drawer 2, a main PC board 5 is mounted. In the main PC board 5, a pickup head 4 carried in the mechanical chassis 1, a driver IC 5a composed of a semiconductor element for controlling the drive of a disk motor 1b, etc., an IC for data processing, an IC 5b, etc. for an AMP are mounted. These ICs 5a and 5b all have high heating values.

Figure 3:
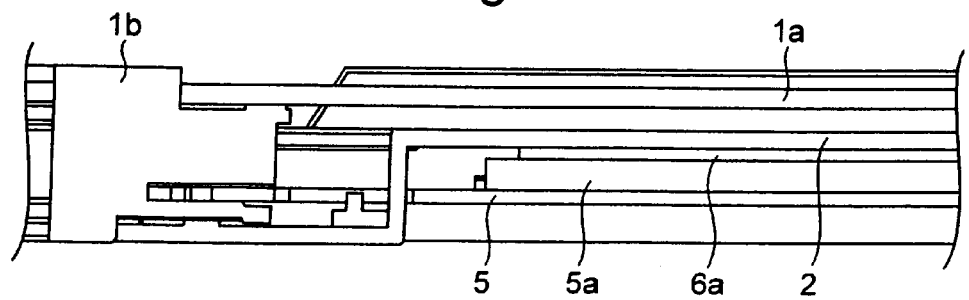
FIG. 3 is a sectional view of the essential portion of the optical disk device according to the embodiment of the present invention.

FIG. 3 is a sectional view of an essential portion of the optical disk device 10.

In the main PC board 5, the driver IC 5a composed of the semiconductor element, the IC for data processing, IC 5b, etc. for the AMP are mounted. The main PC board 5 is mounted at the back of the drawer 2, that is, at the host side of the optical disk device 10. The disk motor 1b for driving an optical disk 1a is arranged near the main PC board 5. To avoid adverse influence due to high double speed and high frequency transmission, it is desired to fix the main PC board 5 relatively near the pickup head 4.

The drawer 2 is formed of a material having good thermal conductivity. For example, the thermal conductivity at 20° C. is desired to be 50 W/m·k or more. Further, in view of lightening the entire device, the specific gravity is desired to be 3 or less.

Table 1 below shows the comparison of the material candidates of the drawer.

TABLE 1

|  | thermal conductivity (W/m · k) | bending elastic modulus (Gpa) | specific gravity (kg/m$^3$) | cost ratio |
|---|---|---|---|---|
| Aluminum alloy | 100 | 71 | 2.71 | 4 |
| Magnesium alloy | 72 | 45 | 1.82 | 2 |
| Reference (Iron) | 42 | 200 | 7.9 | 1 |

It is preferred to select an aluminum alloy if the thermal conductivity is particularly prioritized. It is preferred to select a magnesium alloy if the whole balance is taken in consideration of weight and cost.

Then, if metals are selected, the aluminum alloy and the magnesium alloy are suitable. However, it may be formed of a resin having a desired thermal conductivity without limiting to the metals.

Thermal conductive members 6a and 6b each having good thermal conductivity is interposed between the semiconductor elements 5a and 5b desired to radiate heat and the drawer 2. As the thermal conductive members 6a and 6b, for example, a thermal conductive rubber is suitable since the thermal conductive rubber has elasticity and good adhesive properties with the semiconductor elements 5a and 5b which are heat generators.

Incidentally, the driver IC 5a is the semiconductor element for controlling to the drive of the pickup head 4, the disk motor 1b, etc. However, the driver IC 5a may be divided into a semiconductor element for controlling to the drive of the pickup head 4 and a semiconductor element for controlling to the drive of the disk motor 1b. In this case, as described above, the thermally conductive member having good thermal conductivity is also interposed between the semiconductor element that is desired to radiate heat and the drawer 2.

With this configuration, the heat generated from the semiconductor elements 5a and 5b is transferred efficiently to the side of the drawer 2 through the thermal conductive members 6a and 6b.

The heat transferred to the drawer 2 is naturally radiated from the surface of the drawer 2. However, thermal convection is induced by a wind flow velocity near the disk 1a rotating near the drawer 2, and the heat is efficiently radiated.

EXAMPLE

In the structure according to the embodiment of the present invention, a three-dimensional model is formed. Parameters are set based on experiment values of
(1) Heating value of a heat source,
(2) Contact condition (Boundary condition),
(3) Thermal conductivity of parts, and
(4) Wind flow velocity raised by the rotation of a disk.

Then, computer software is used to analyze the temperature (a temperature rising rate from a room temperature) that becomes stationary due to thermal conduction and thermal radiation (heat radiation).

The comparison of a structure according to the embodiment of the present invention with a structure for radiating the heat of the IC by fixing a substrate to an external housing as a conventional structure is shown in Table 2.

TABLE 2

|  | experiment result conventional structure | analytic result conventional structure | structure of this invention |
|---|---|---|---|
| IC | 65 | 64 | 62 |
| pickup | 64 | 64 | 63 |
| drive air temperature | 50 | 36 | 30 |
| atmospheric temperature | 25 | 25 | 25 |
| disk surface wind flow velocity: 3.5 m/s |  |  |  |

As apparent from the Table 2, the temperature is lowered by 3° C. at the IC. The temperature is lowered by 6° C. in the drive atmosphere. The temperature is lowered by 1° C. at the pickup. Thus, remarkable heat radiation effect can be confirmed.

As described above, in this embodiment, the drawer is formed of the material having good thermal conductivity. The semiconductor element of the heat generator is brought into close contact with the drawer by the thermal conductive member. Accordingly, the heat is efficiently transferred to the drawer side. The thermal convection is induced by the wind flow velocity near the disk opposite in the vicinity of the drawer. The heat transferred to the drawer side is efficiently radiated into the atmosphere. Thus, the rise of the internal temperature of the optical disk device can be suppressed. Further, the heat of the semiconductor element is not transferred to the mechanical chassis as low as possible. Accordingly, thermal influence to the pickup head is avoided as much as possible. Thus, the lifetime of the operation of the pickup head can be prolonged.

Here, in a slim type optical disk device for carrying a notebook-sized personal computer according to the embodiment of the present invention, in addition to the adoption of the above-mentioned heat radiation structure, a new mechanism of an ejection mechanism is adopted. This ejection mechanism will be described.

Figure 4:
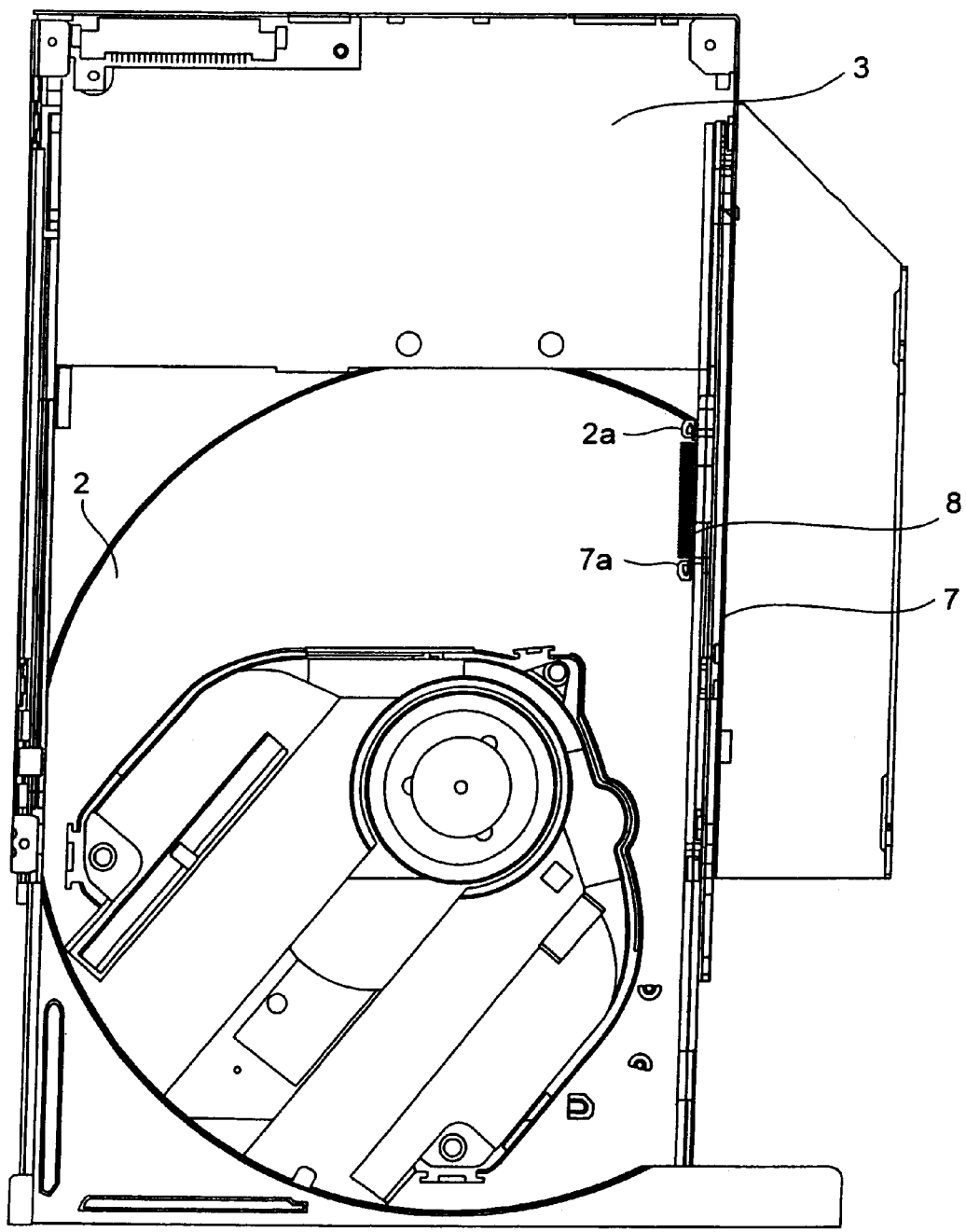
FIG. 4 is a top view of the optical disk device according to the embodiment of the present invention.

FIG. 4 is a top view of the optical disk device according to the embodiment of the present invention. The drawer 2 is slidable to the bottom plate 3 for forming a drive housing. As shown in FIG. 4, guide rails 7 for supporting slidably the drawer 2 are arranged at the left and right sides of the drawer 2. Hooks are respectively formed at the guide rails 7 of a locking side for locking the drawer 2 to the bottom plate 3 and the drawer 2. An ejection spring 8 is suspended between the guide rail side hook 7a and a drawer side hook 2a.

Figure 5:
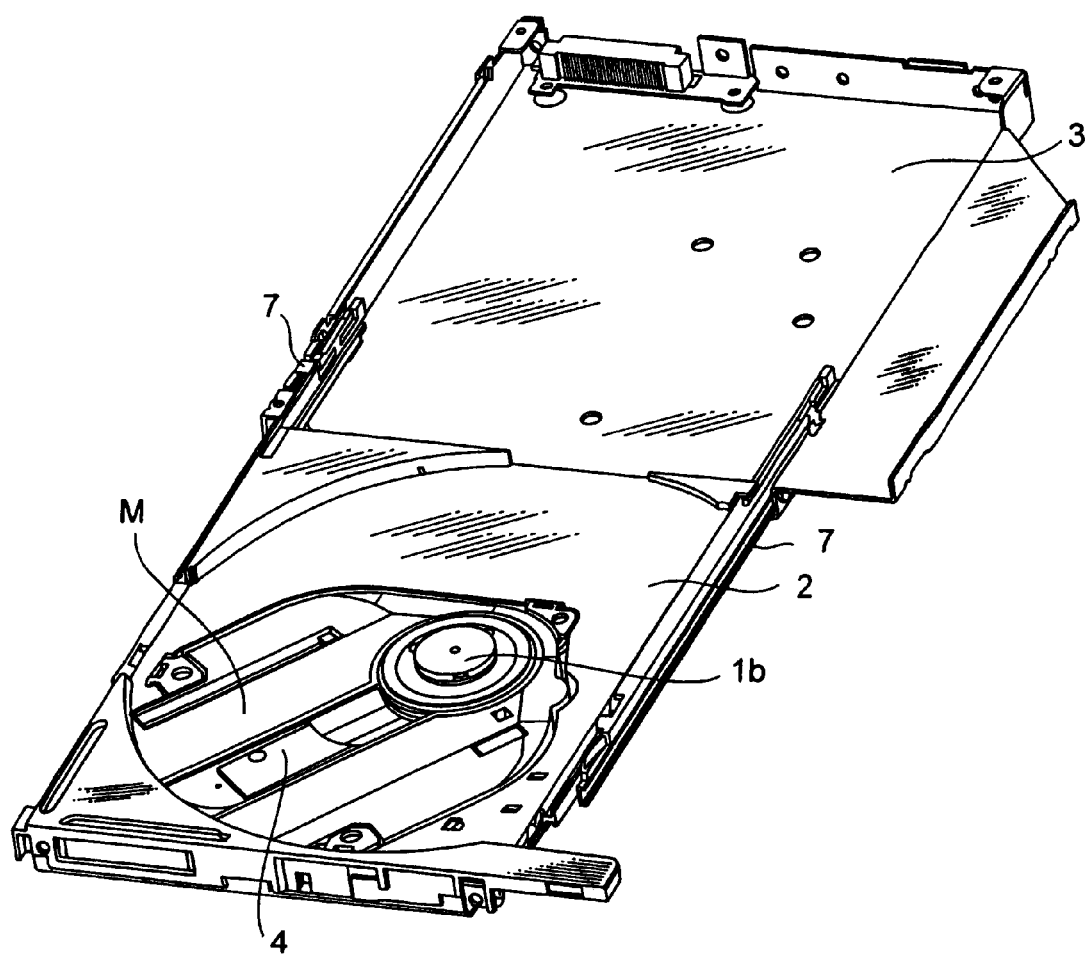
FIG. 5 is a perspective view of the entire optical disk device as viewed from the front side of the optical disk device.
Figure 6:
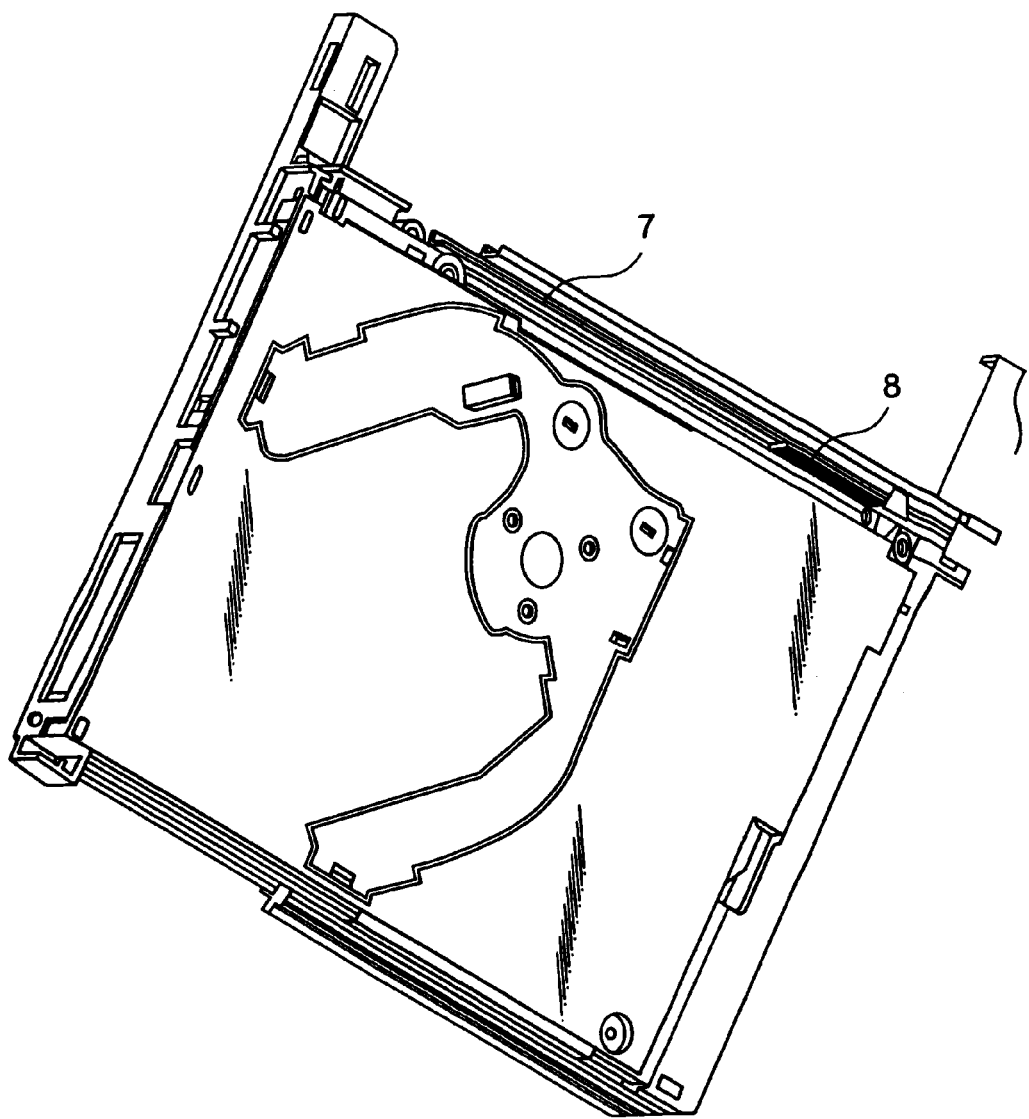
FIG. 6 is a perspective view of the entire optical disk device as viewed from the back side of the optical disk device.

FIG. 5 is a perspective view of the entire optical disk device as seen from the front side of the optical disk device. FIG. 6 is a perspective view of the entire optical disk device as seen from the back side of the optical disk device.

As shown in FIG. 5, there are provided the pickup head 4 for reading/writing data, and the bottom plate 3 as a cover member for protecting and shielding the drawer 2 carrying a disk drive mechanism M of a disk motor 1b, etc. for rotatably driving the optical disk and the bottom side of the drawer 2. The drawer 2 is slidable to the bottom plate 3. For that, the guide rails 7 for slidably supporting the drawer 2 are arranged at the left and right sides of the drawer 2.

Figure 7:
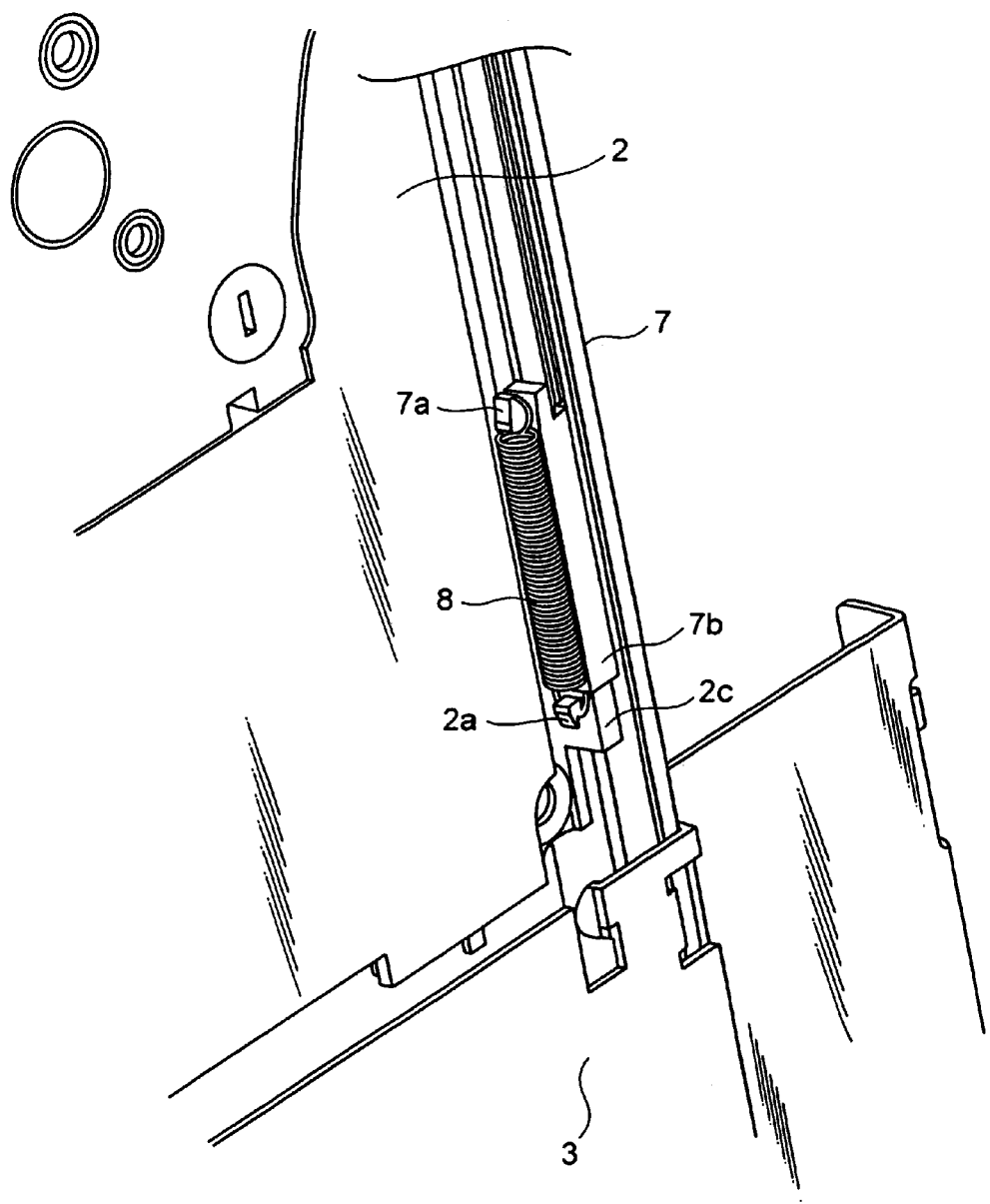
FIG. 7 is a perspective view showing the detail of a spring mounting portion of the optical disk device.

FIG. 7 is a perspective view showing the detail of a spring mounting portion. FIG. 8 is a perspective view showing the detail of the lateral pressure operating portion. As shown in FIG. 6 and FIG. 7, the hooks are respectively formed at the guide rail 7 of the lock side for locking the drawer 2 to the bottom plate 3 and the drawer 2. An ejection spring 8 is suspended between the guide rail side hook 7a and the drawer side hook 2a. The stopper 7b provided at the upper portion in FIG. 7 and the stopper 2c provided at the lower portion in FIG. 7 are contact with each other to regulate respectively the positions of the guide rail 7 of the lock side and the drawer 2. Further, at this time, the guide rail 7 of the lock side is regulated so as to be projected in a desired size from the drawer 2.

As shown in FIG. 8, a lateral pressure projection 9 for imparting a lateral pressure is arranged at the end of the guide rail 7 of the lock side. To imparting a spring property, etc., the lateral pressure projection 9 is, for example, a resin spring made of a polyacetal resin. A lateral pressure transfer projection 9a for transferring the lateral pressure is formed at the end of the lateral pressure projection 9. A lateral pressure receiving portion 2b for receiving the lateral pressure is formed at the rear end of the drawer 2. Further, a biasing force receiving wall 3b for receiving a biasing force is formed at the corner side wall of the back wall 3a of the bottom plate 3. The lateral pressure projection 9 is formed integrally with the lock side guide rail 7. It is suitable to form the lateral pressure receiving portion 2b integrally with the drawer 2 and to form the biasing force receiving wall 3b integrally with the bottom plate 3. It is configured that the lateral pressure is acted between the drawer 2 and the guide rails 7 by utilizing an ejection biasing force by a mutual interference at a drawer insertion completing position. Such a lateral pressure suppresses the fluctuation between the drawer 2 and the guide rails 7.

Subsequently, the force generated when the drawer is inserted into and discharged from the optical disk device body will be described with reference to the drawings.

Figure 9A:
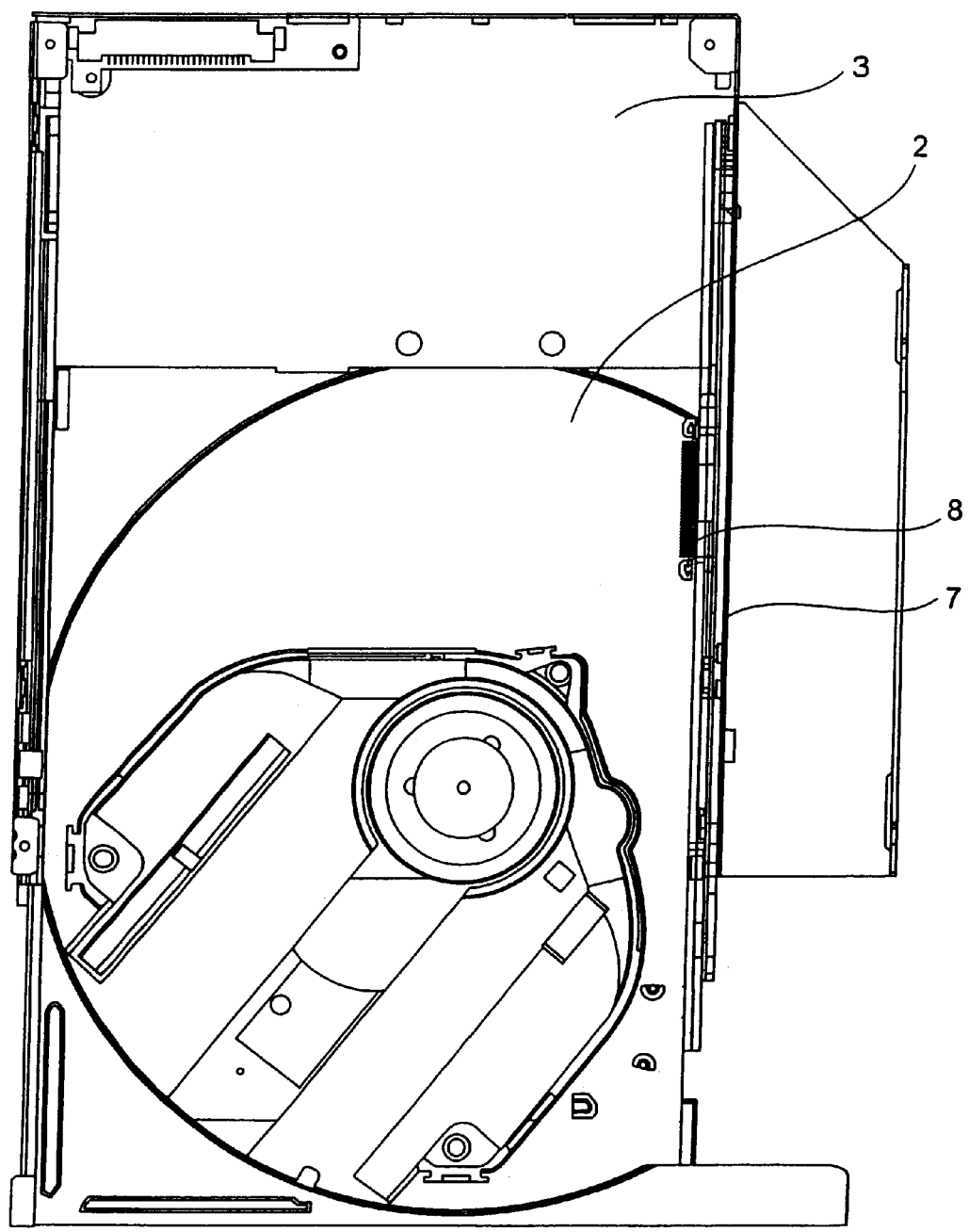
FIG. 9A is an explanatory view showing the behavior of an ejection spring at the time of entering of the drawer.
Figure 9B:
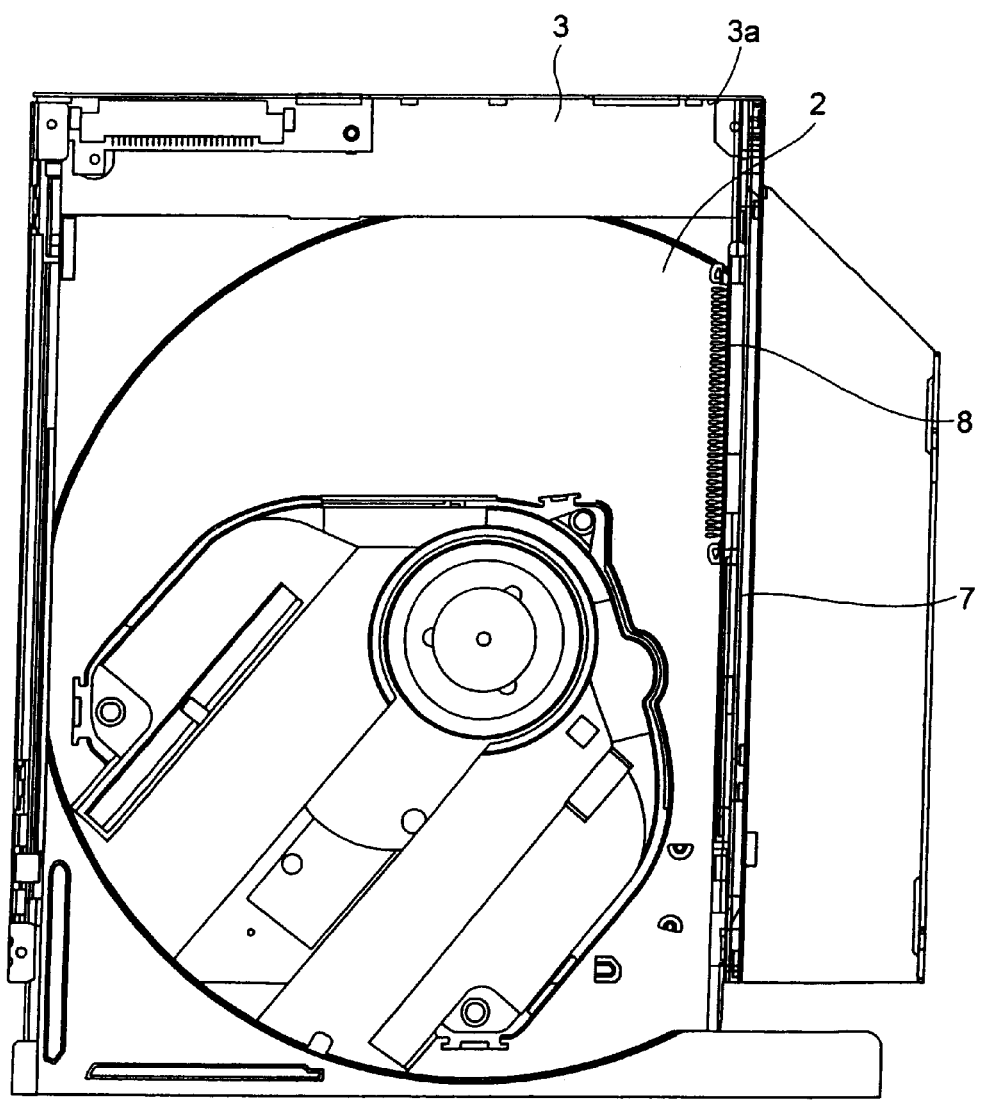
FIG. 9B is another explanatory view showing the behavior of the ejection spring at the time of entering of the drawer.
Figure 9C:
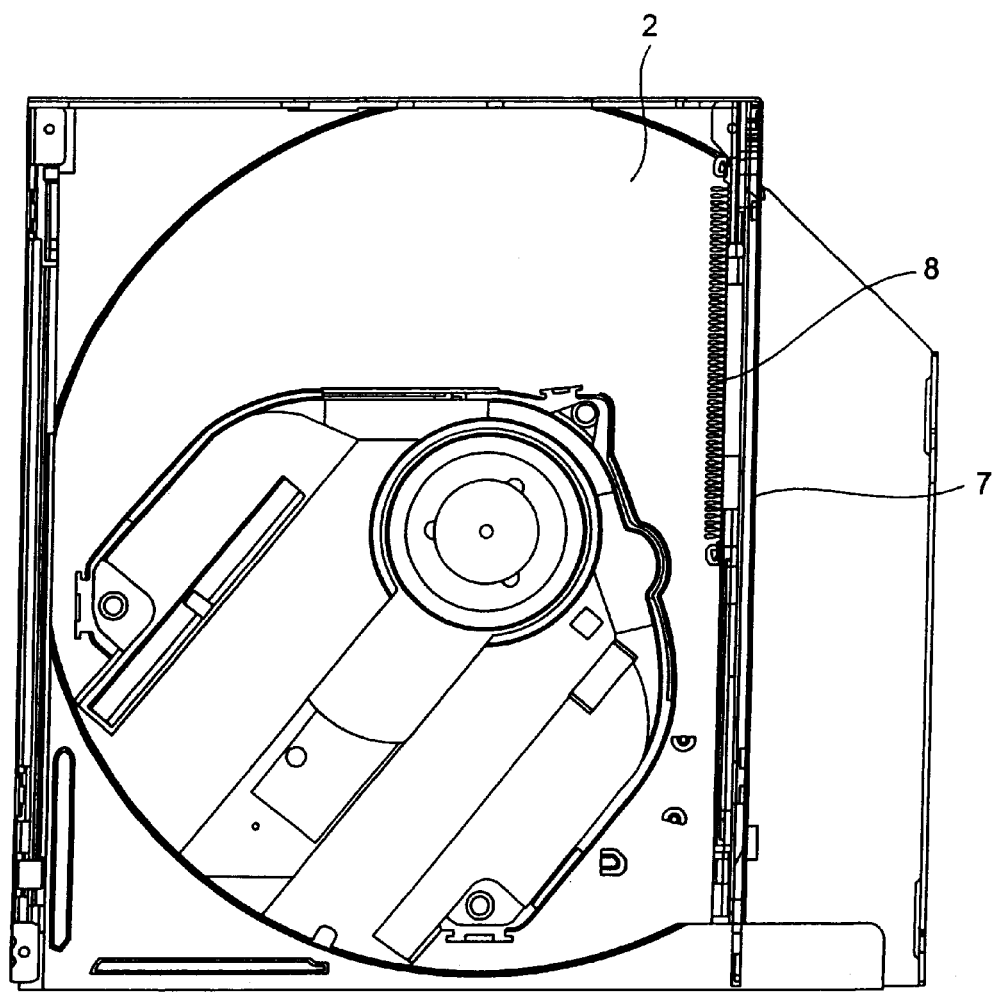
FIG. 9C is still another explanatory view showing the behavior of the ejection spring at the time of entering of the drawer.

FIG. 9A, FIG. 9B and FIG. 9C are explanatory views showing the behavior of the ejection spring 8 at the drawer insertion time.

In the state shown in FIG. 9A, the stoppers 2c and 7b shown in FIG. 7 are contacted with each other. The ejection spring 8 is in a suspended initial biasing state. The guide rail 7 of the lock side biased by a spring is integrated with the drawer 2 on the drawer, and advanced to the bottom plate 3 of the device body side.

Then, in the state shown in FIG. 9B, the innermost end of the guide rail 7 of the lock side is contacted with the back wall 3a of the bottom plate. The drawer 2 slides to the guide rails 7. The mutual stoppers 2c and 7b are separated. The ejection spring 8 is on the way of extension.

In the state shown in FIG. 9C, the insertion of the drawer 2 into the bottom plate 3 of the optical disk device body is completed. Then, the drawer 2 is locked and held by a locking mechanism (not shown). A restoring force of the ejection spring 8 due to the maximum extension is stored as the drawer discharging force. When this restoring force is released by unlocking the drawer 2, the drawer 2 is ejected from the optical disk device body by the drawer discharging force in the state that the end of the guide rail 7 of the lock side is contacted with a back wall 3a of the bottom plate.

Figure 10A:
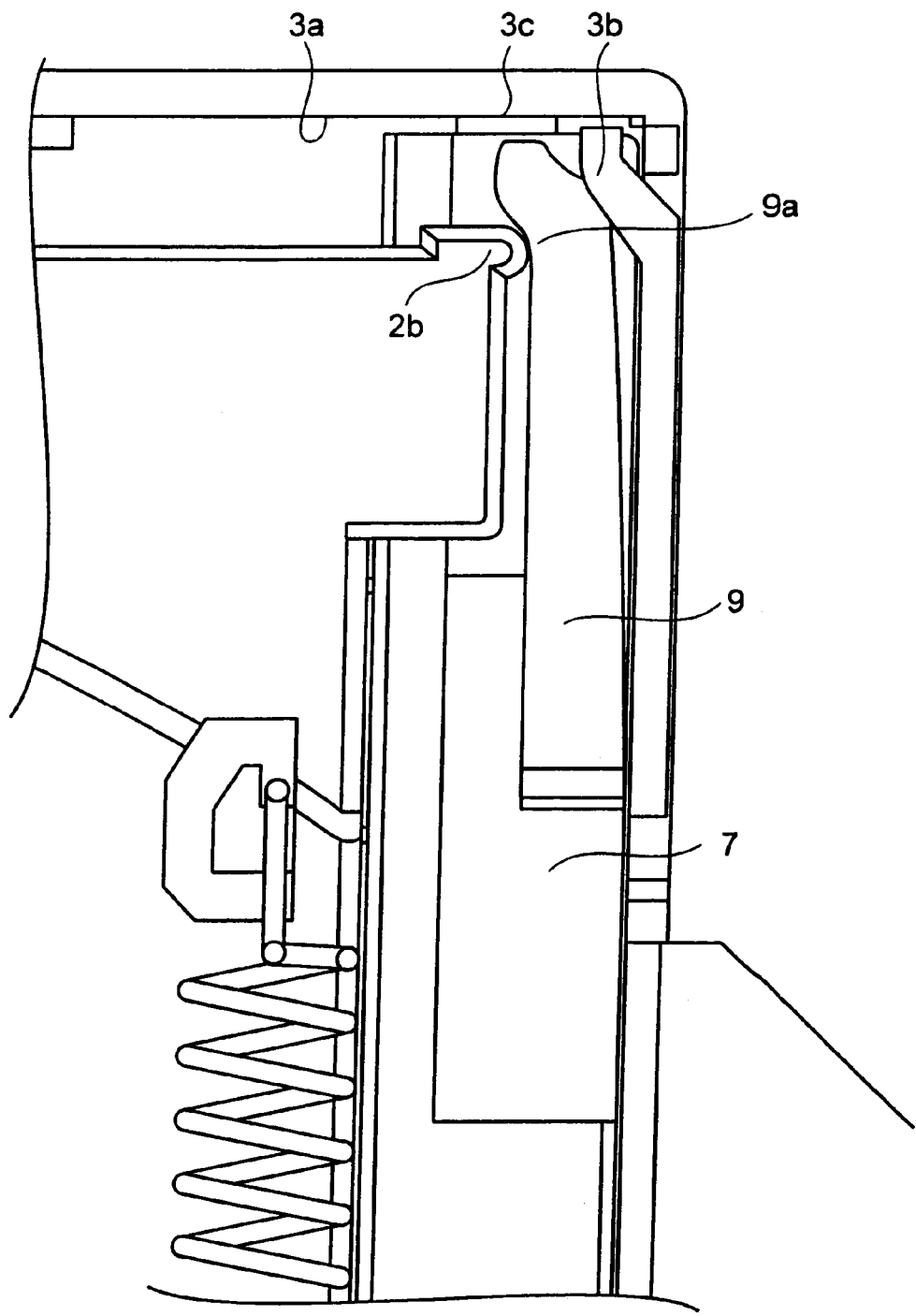
FIG. 10A is an explanatory view showing the state of generating a lateral pressure of the drawer.
Figure 10B:
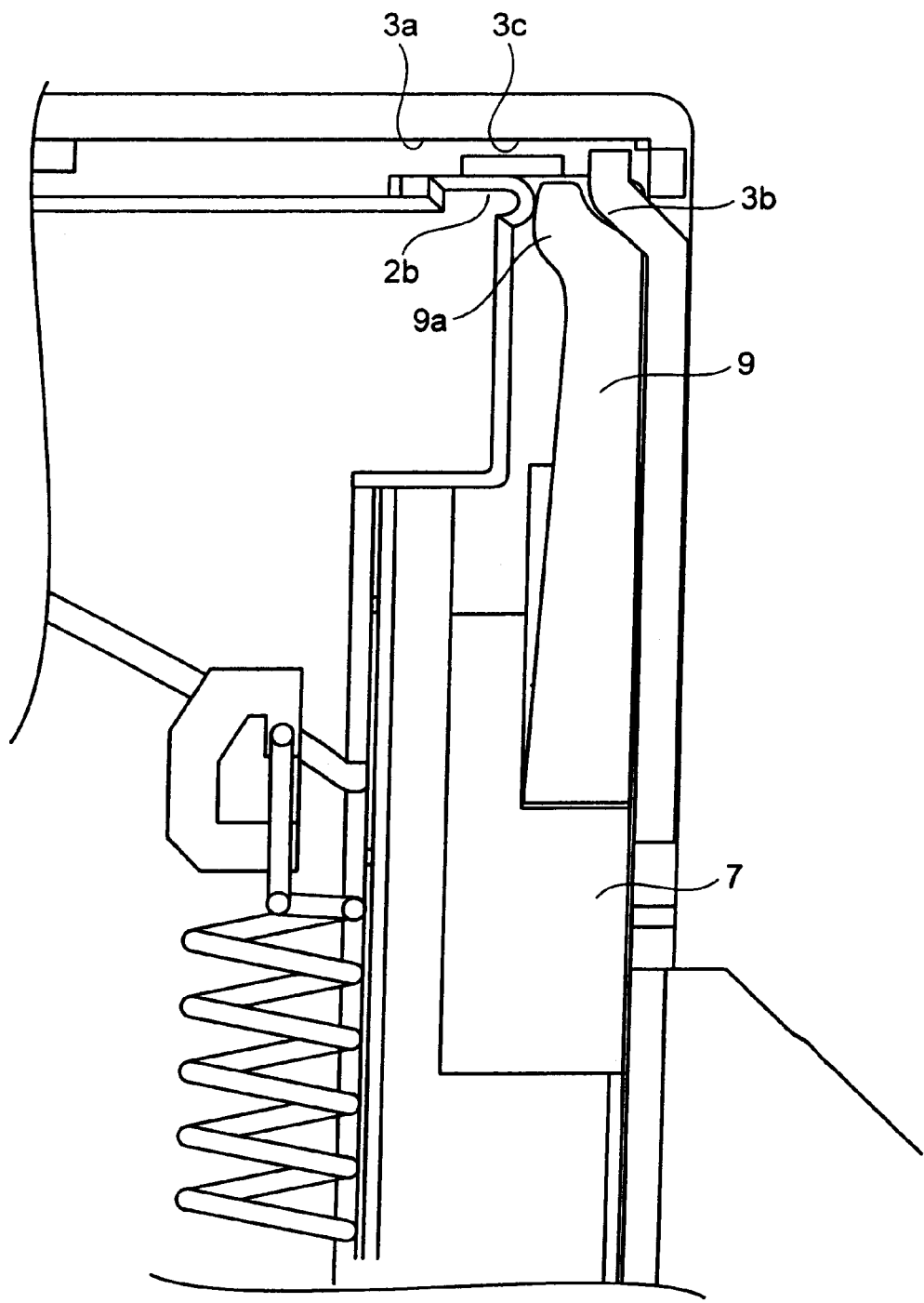
FIG. 10B is another explanatory view showing the state of generating the lateral pressure of the drawer.

Then, the generation of the lateral pressure of the drawer will be described. FIG. 10A and FIG. 10B are explanatory views each showing the state of generating the drawer lateral pressure. FIG. 10A corresponds to FIG. 9B, and the ejection spring 8 is not shown. As shown in FIG. 10A, the tip end of the guide rail is regulated to the rail contact portion 3c of the back wall 3a of the bottom plate. The lateral pressure receiving portion 2b of the drawer side reaches in the vicinity of the lateral pressure transfer projection 9a of the guide rail side. Further, the biasing force receiving wall 3b formed at the bottom plate side is located adjacent to but does not act on the portion 2b and the projection 9a.

Further, FIG. 10B corresponds to FIG. 9C. At the position shown in FIG. 10B in which the drawer 2 enters the optical disk device body, the lateral pressure receiving portion 2b of the drawer side presses the lateral pressure transfer projection 9a at the side of the guide rail 7. The lateral pressure receiving portion 2b slides to the outside by the deformation of the lateral pressure projection 9. Thus, the lateral pressure receiving portion 2b is guided to the biasing force receiving wall 3b of the bottom plate side. Then, the guide rail 7 of the lock side is pushed out toward the front side. In this case, the lateral pressure receiving portion 2b of the drawer side separates from the rail contact portion 3c of the back wall 3a of the bottom plate. The entire biasing force acts on the biasing force receiving wall 3b. The biasing force is split into the force in the side pressure direction and the force in the drawer discharging direction according to the oblique surface angle of the biasing force receiving wall 3b. Thus, a fluctuation suppressing force (side pressure) of the drawer 2 and the guide rails 7 are created.

According to the above-mentioned embodiment, an optical disk device having the following features can be provided.

(1) An optical disk device comprising a drawer carrying the disk drive mechanism; a drive housing; guide rails for slidably supporting the drawer to the drive housing; and an ejection spring suspended between the guide rail and the drawer to store a repulsion force when the drawer is contained in the drive housing, wherein a discharging force of the drawer from the drive housing is obtained by releasing the repulsion force of the ejection spring stored when the drawer is contained in the drive housing.

(2) An optical disk device, wherein a biasing force to the drawer is given to the guide rails for slidably supporting the drawer carrying the disk drive mechanism to the drive housing by the ejection spring, and in the state that the guide rail is contacted with a cover member covering the drawer from the rear side, the drawer is discharged from the drive housing.

(3) The optical disk device as described in (2), wherein the cover member generates a component force in the side pressure direction at a position where the cover member receives the ejection biasing force at the drive housing insertion completing position of the drawer carrying the disk drive mechanism, and the side pressure is applied to the drawer and the guide rails.

(4) The optical disk device as described in (3), wherein a side pressure member for imparting a side pressure having a projection for transferring the side pressure is formed integrally with the end of the guide rail, a side pressure receiving portion for receiving the side pressure from the side pressure member is formed integrally with the end of the drawer, and the portion for receiving the biasing force is formed integrally with the cover member.

In the conventional structure, as an inclusion for transferring an ejection force, an ejection pin, a mechanism for guiding the ejection pin, an assembling man-hour of the mechanism, and a space for laying out them are required. This becomes a fault for cost saving and space saving.

Further, if a fluctuation exists in the drawer and the guide rails in the locked state, when the optical disk device is carried in a notebook-size personal computer and is driven in a high double speed manner, abnormal vibration and noise are generated due to unbalanced rotation caused by the eccentric gravity of the disk, etc. There is possibility of giving unpleasant feeling to the user of a personal computer. Thus, it is necessary to add another member (leaf spring, etc.) to eliminate the fluctuations of the drawer and the guide rails in the locked state.

The optical disk device of the above-mentioned embodiment comprises an ejection mechanism utilizing the restoring force of the ejection spring suspended between the guide rail and the drawer for the discharge force of the drawer. The restoring force is caused by the maximum extension of the drawer of the ejection spring when the drawer is inserted into the drive housing and locked and held. Accordingly, space saving and cost saving by the reductions in the number of parts and the man-hour can be achieved. An assembling property at the manufacturing time can be improved. Thus, errors at the assembling time can be reduced. Further, reliability can be improved due to the reduction in the number of parts.

Furthermore, the optical disk device is configured to bias the side pressure simultaneously to the drawer and the guide rails by the mutual interference action of the cover member, the guide rails and the drawer against the fluctuation of the drawer and the guide rails in the locked state. Thus, it is not necessary to add another member (leaf spring, etc.), and a fluctuation preventing effect is improved. Particularly, a vibration preventing effect at the high double speed drive time of the disk is obtained. Noise can be reduced. Further, the unpleasant feeling to the user of a personal computer can be eliminated.

Figure 11:
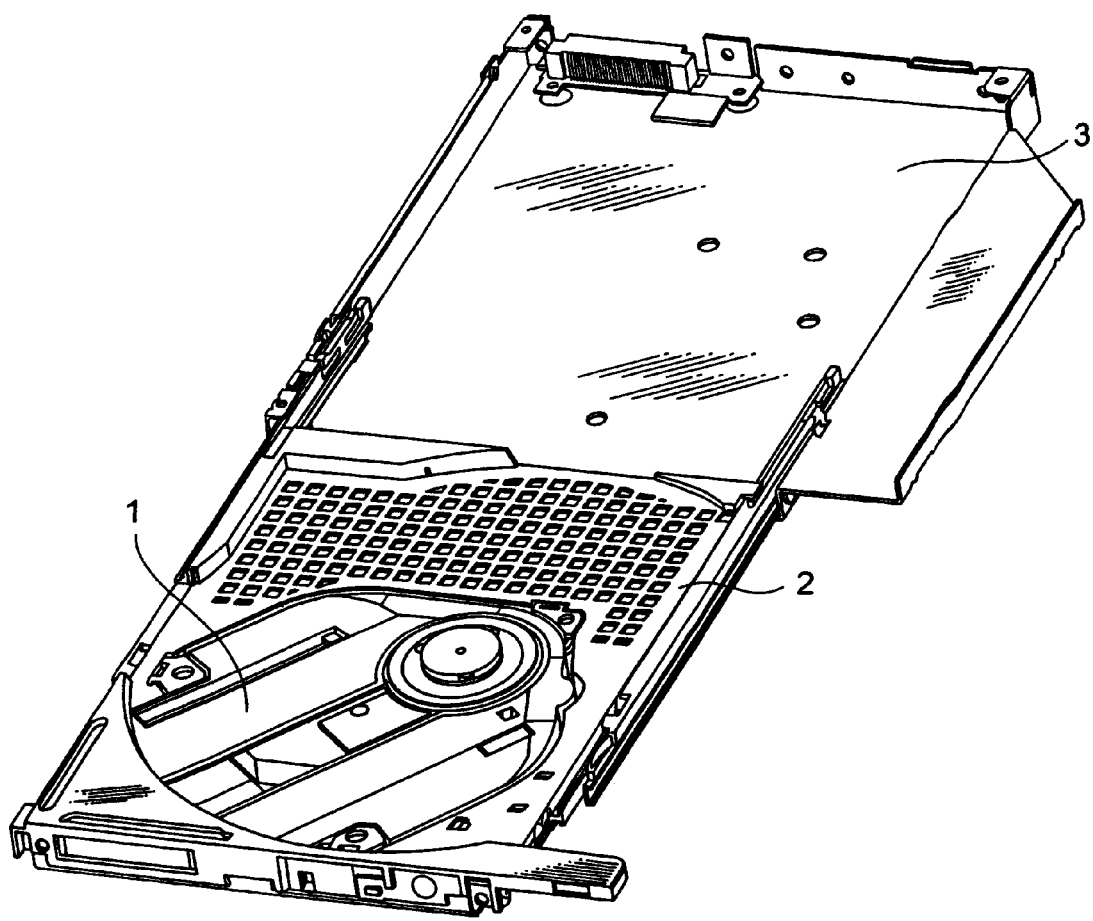
FIG. 11 is a perspective view of the optical disk device according to another embodiment of the present invention.

Then, another embodiment of the present invention will be described by referring to FIG. 11. A plurality of uneven portions are formed on the surface of the drawer 2 of the movable side base for mounting the mechanical chassis 1. The surface of the drawer 2 is not limited only to the uneven portions, but may be recess portions. When such a shape is adopted, the surface area of the drawer 2 is increased. Accordingly, the heat dissipation efficiency is raised like a large-sized heat radiator.

According to the optical disk device of the embodiment of the present invention, the heat of the semiconductor element is efficiently transferred to the drawer side. The thermal convection is induced due to the wind flow velocity near the disk opposite near the drawer. The heat transferred to the drawer side is efficiently radiated into the atmosphere. Thus, the rise of the temperature in the optical disk device can be suppressed.

Incidentally, the present invention is not limited to the above-mentioned embodiments. At the executing stage, the constituting elements can be deformed and embodied without departing from the sprit and scope of the present invention. Further, various inventions may be formed by a suitable combination of a plurality of the constituting elements disclosed in the above-mentioned embodiments. For example, several constituting elements may be deleted from the entire constituting elements shown in the embodiments. Further, the constituting elements in the different embodiments may be suitably combined.

What is claimed is:

1. An optical disk device, comprising:
a mechanical chassis carrying a driving mechanism supporting and controlling the rotation of an information recording medium, and a pickup head;
a substrate mounting a semiconductor element at least for a driver IC and an IC for an AMP;
a drawer mounting the mechanical chassis and the substrate, and formed at least partly using a material having good thermal conductivity,
a thermal conductive member that is interposed between the semiconductor element of the substrate and the drawer, and transfers heat generated from the semiconductor element by contacting the semiconductor element; and
a bottom plate that holds the drawer in a slidable manner, wherein
the thermal conductive member transfers heat of the semiconductor element so that the heat is radiated from a front surface of the drawer.

2. An optical disk device, comprising:
a mechanical chassis carrying a driving mechanism supporting and controlling the rotation of an information recording medium, and a pickup head;
a substrate mounting a semiconductor element at least for a driver IC and an IC for an AMP;
a drawer mounting the mechanical chassis and the substrate, and formed by using a material of aluminum alloy or magnesium alloy;
a thermal conductive member that is interposed between the semiconductor element of the substrate and the drawer, and is made of a material of thermal conductive rubber which transfers heat generated from the semiconductor element by contacting the semiconductor element; and
a bottom plate that holds the drawer in a slidable manner, wherein
the thermal conductive member transfers heat of the semiconductor element so that the heat is radiated from a front surface of the drawer.

3. The optical disk device according to claim 2, wherein the aluminum alloy or magnesium alloy has thermal conductivity at 20° C. of 50 W/m·k or more, and specific gravity of 3 or less.

* * * * *